United States Patent [19]

Bolton

[11] 4,428,265

[45] Jan. 31, 1984

[54] TAPE SLITTER AXIAL LOADING SYSTEM

[75] Inventor: James C. Bolton, Ojai, Calif.

[73] Assignee: Industrial Tools Inc., Ojai, Calif.

[21] Appl. No.: 313,760

[22] Filed: Oct. 22, 1981

[51] Int. Cl.[3] .......................... B23D 19/04; B26D 1/24

[52] U.S. Cl. .......................................... 83/502; 83/504; 83/700

[58] Field of Search ................. 83/500, 501, 502, 504; 192/56 R; 74/397; 81/473, 474, 475, 476

[56] References Cited

U.S. PATENT DOCUMENTS

| | | | |
|---|---|---|---|
| 54,257 | 4/1866 | Remington | 81/473 |
| 2,792,889 | 5/1957 | Kusel | 83/501 |
| 3,730,043 | 5/1973 | Zimmermann | 83/502 |
| 4,026,176 | 5/1977 | Weiskopf | 83/582 |
| 4,330,092 | 5/1982 | Roman | 83/501 |

FOREIGN PATENT DOCUMENTS

| | | | |
|---|---|---|---|
| 706238 | 12/1979 | U.S.S.R. | 81/473 |

*Primary Examiner*—E. R. Kazenske
*Assistant Examiner*—Hien H. Phan
*Attorney, Agent, or Firm*—Ralph B. Pastoriza

[57] ABSTRACT

The axial loading system is used in a tape slitter comprised of first and second arbors in spaced parallel relationship carrying male and female cutting knives for slitting tape. These cutting knives are in the form of a series of uniformly axially spaced discs on the first arbor having their corner peripheries bearing in an axial direction against corresponding female discs on the second arbor. The loading system comprises a combination threaded arrangement at one end of the first arbor with a torque applying tool for rotating the threaded means to thereby adjust the axial force of the male blades against the female blades. The torque applying tool not only enables the rotation to take place but will cease functioning after a given torque has been reached, thereby assuring that a given axial force of the male blades against the female blades will not be exceeded.

5 Claims, 4 Drawing Figures

TAPE SLITTER AXIAL LOADING SYSTEM

FIELD OF THE INVENTION

This invention relates broadly to cutting apparatus and more particularly to a tape slitter incorporating an improved axial loading system for enabling accurate adjustment of the force between the cutting blades.

BACKGROUND OF THE INVENTION

Magnetic tape for reels, cassettes and the like must be manufactured within close tolerances, particularly with respect to width, skew and weave of the tape. The matter of tolerance is particularly critical in the case of video recording tape since the video recorders and playback machines are precision made and highly sensitive to any variations in tape width when utilized in the machines.

In the preparation of such tapes, the normal practice is to provide a relatively wide ribbon of tape and then slit this ribbon in a longitudinal direction, with spaced knives or equivalent cutting instruments.

With respect to the foregoing, one of the most successful types of tape slitters includes a frame supporting first and second arbors in spaced parallel relationship. The first arbor carries male cutting blades in the form of a plurality of discs in axially spaced positions while the second arbor carries female blades with engaging surfaces cooperating with the peripheries of the discs. The arrangement is such that a wide ribbon of tape passed between the arbors will be slit into parallel smaller width ribbons.

In some prior art systems, power has been provided to rotate the arbors and thereby feed the wide ribbon between the arbors and effect the cutting. In other improved prior art devices, air bearings or fine precision mechanical bearings have been so designed that no auxiliary power is required but rather simply pulling the wide ribbon of tape between the knives rotates the arbors to effect the slitting operation.

Over prolonged use of these devices, the cutting blades can become worn and as a result, it is necessary to either sharpen the same or in some instances simply to shift the first arbor axially with respect to the second arbor to increase the engagement force between the male and female blades, thereby compensating for such wear. In this particular operation, it is important to not exceed a given force which might warp the blades and thus result in improper cutting. On the other hand, enough force must be applied to assure that a cut will be made. In other words, there is an optimum force between the cutting blades for best results. For a given machine, this force can be determined empirically. Thereafter, a force gage is utilized in adjusting the force where such adjustment becomes necessary over extended periods of use.

Axial adjustments of one arbor with respect to the other is usually accomplished by guide rods and appropriate set screws and equivalent means for effecting the adjustment. Once an adjustment has been made and the proper force has been determined as by a gauge, the set screws are tightened to lock the assembly in place.

U.S. Pat. No. 3,899,948 is a good example of a typical prior art cutter, wherein an axial adjustment is provided. In this instance, individual lead screws in a frame portion are respectively adjusted and then a collar and bearing arrangement is locked to the arbor to maintain the adjusted position.

U.S. Pat. No. 3,994,193 shows another typical prior art slitter of the type under consideration wherein an axial loading is accomplished by an air bearing which may be supplemented by a spring if desired. In this case, the axial loading is adjusted by a needle valve which in turn adjusts the air pressure.

BRIEF DESCRIPTION OF THE PRESENT INVENTION

With the foregoing considerations in mind, the present invention contemplates an improved axial loading system for a tape slitter wherein an adjustment can be very quickly made and secured without the necessity of special force gauges and the like to determine the adjusted force and yet wherein a very accurate force setting is realizable. As a result, it is very easy for a person to effect the desired adjustment and thereby more frequent adjustments can be made to result in longer life of the slitter and a higher quality in the actual cuts being made.

Briefly, the axial loading system includes axially movable bearing means supporting the first arbor carrying the male blades in the frame for rotation. Threaded means is mounted on the frame and movable upon rotation to exert a force against the first arbor in an axial direction to increase the force of the male blades against the female blades. Rotation for this adjustment is accomplished by using in combination with the threaded means a manual adjustable torque applying means which will only apply a torque corresponding to a given desired axial force. After this given axial force has been achieved, the torque applying means will no longer rotate the threaded means so that the desired force of the male blades against the female blades can be automatically set by the torque applying means without the need of special force indicating gauges.

An appropriate lock nut is provided on the threaded means for simple manual locking of the set position after an adjustment has been made.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
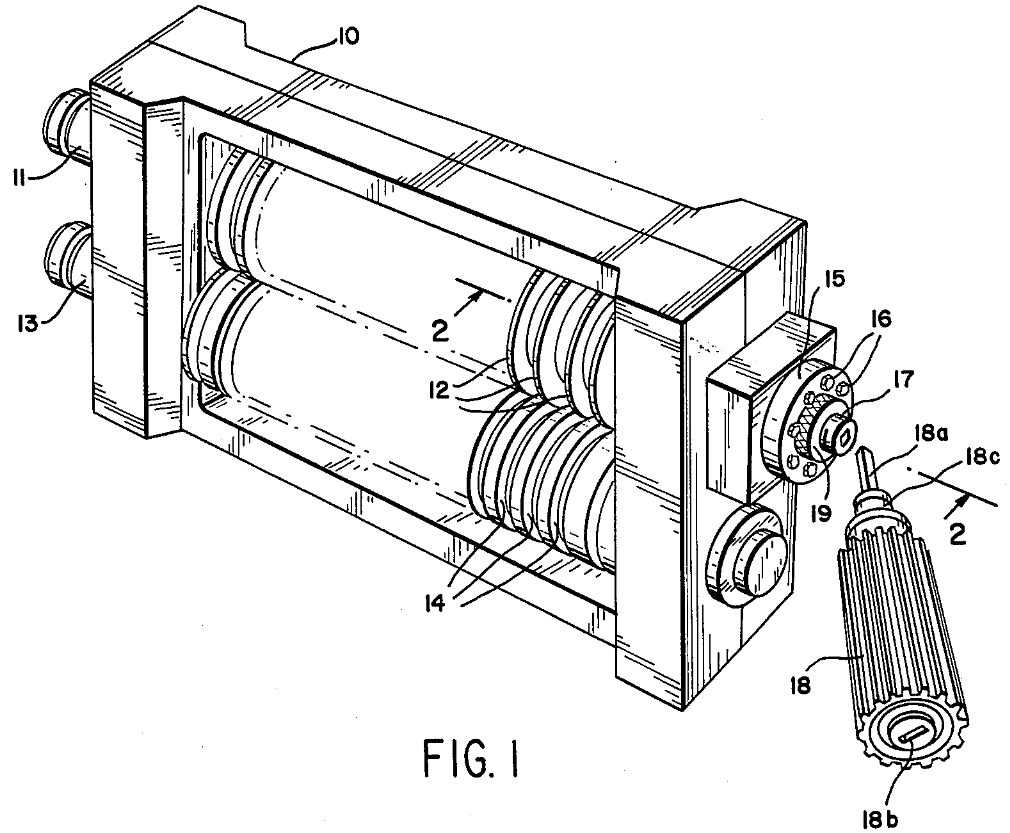
FIG. 1 is a perspective view of a tape slitter incorporating the axial loading system of this invention.

Referring first to FIG. 1, there is shown a tape slitter comprising a frame 10 rotatably supporting a first arbor 11 carrying a plurality of male blades in the form of discs 12 in axially spaced positions. Frame 10 also rotatably supports a second arbor 13 carrying a plurality of female blades 14 having portions facing in an axial direction towards one end of the first arbor. In FIG. 1, this one end constitutes the right hand end and the manner in which the male and female blades engage each other will become clearer as the description proceeds.

In the particular tape slitter illustrated, appropriate bearing means to be described support the arbors 11 and 13 in such a manner that they can rotate very easily simply by the action of pulling a wide web of tape therebetween so that no auxiliary power is required when the web of tape is slit by the blades.

Still referring to FIG. 1, there is shown adjacent to the one end of the first arbor 11; that is, on the right side of the frame as viewed in FIG. 1, a stationary cup-shaped member 15 secured to the frame as by appropriate bolts 16. A movable member 17 is in threaded engagement with the cup-shaped member 16 and cooperates therewith such that rotation of the movable member will exert an axial force on the one end of the bearing for the arbor 11. Rotation of the movable member 17 for applying this force is accomplished by a manually operable torque applying means in the form of a tool 18. This tool 18 includes a drive shaft **18*a* at its front end and a torque setting adjustment device 18*b* at its opposite end. Essentially, the adjustment device 18*b* permits a desired torque as measured, for example, in inch pounds to be set, an appropriate scale 18*c* being provided for this purpose. When the set torque is exceeded on the shaft 18*a*, then the shaft 18*a* will no longer rotate within the tool 18 so that greater than the set torque cannot be applied to the movable member 17**.

Once an appropriate adjustment has been made, all as will become clearer as the description proceeds, an appropriate lock nut 19 on the movable member 17 is tightened to secure the axial position of the movable member.

Figure 2:
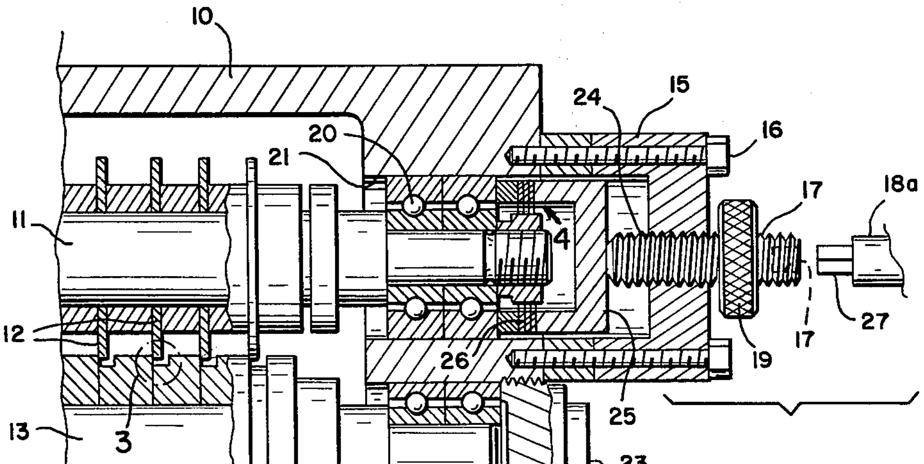
FIG. 2 is a fragmentary cross section with certain portions shown in full lines taken generally in the direction of the arrows 2—2 of FIG. 1.

All of the foregoing will become clearer by now referring to FIG. 2 wherein the one end of the first arbor 11 is shown in greater detail as including a bearing 20 receivable within a bore 21 in the frame 10 such that the bearing with the arbor 11 itself can shift axially within the bore 21. Thus, the first arbor 11 is mounted both for rotation and axial movement relative to the frame 10.

The second arbor 13 carrying the female blades 14, in turn, is mounted only for rotation as by bearings 22 within the frame 10. An appropriate end stop structure 23 blocks or prevents any axial movement of the second arbor 13 relative to the frame.

Referring now to the upper right portion of FIG. 2, it will be noted that the cup-shaped member 15 includes a central threaded bore 24 in its floor in coaxial alignment with the axis of the first arbor 11. The threaded member 17 in turn is threadedly received within this bore as shown. A resilient means in the form of a collar element 25 and cooperating spring means 26 are positioned between the end of the movable member 17 and the outer bearing race for the arbor bearings 20 such that threaded inward movement of the movable member 17 will move the bearing and arbor through the member 25 and cooperating spring means 26. This spring means provides a given degree of resiliency between the male and female blades in an axial direction.

It will be noted in FIG. 2 that the movable member 17 received within the cup 15 has an exposed end cavity **17*a* which might be shaped to receive an Allen wrench. An appropriate fitting illustrated at 27, in turn, is received within the end of the shaft 18*a* for the tool 18 described in FIG. 1. The fitting 27 can be designed specifically for the particular cavity 17*a*** so that other types of tools cannot be used in making the adjustment and thus tampering by unauthorized personnel is inhibited.

Figure 3:
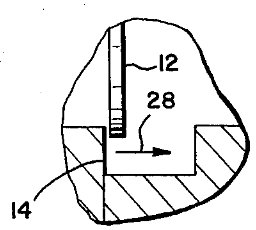
FIG. 3 is a greatly enlarged fragmentary view, partly in cross section of that portion of the structure enclosed within the circular arrow 3 of FIG. 2.

Referring now to the enlarged view of FIG. 3, it will be noted that the female blades such as the blade 14 has an engaging portion facing in an axial direction indicated by the arrow 28; that is, towards the referred-to one end of the first arbor. Therefore, movement of the first arbor in a second axial direction opposite to the direction of the arrow 28 increases the engagement force between the male blades such as the male blade 12 and the female blades such as the female blade 14. It will be appreciated from FIG. 3 that as the engaging portions of the blades such as 12 and 14 wear over long periods of time, an axial adjustment of the blade 12 to the left as viewed in FIG. 3 can compensate for this wear.

Figure 4:
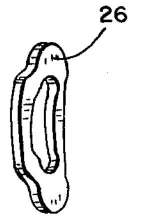
FIG. 4 is a perspective view of one of the spring elements looking generally in the direction of the arrow 4 of FIG. 2.

FIG. 4 illustrates in perspective view one of the springs 26 described in FIG. 2 and it will be noted that the same takes the form of a washer-shaped member having planner portions displaced so as to provide a desired resiliency.

OPERATION

With the foregoing description in mind, the operation of the tape slitter axial loading system will be evident.

Initially, a proper force between the male blades 12 and the female blades 14 can be established at the factory and the reaction against the movable member 17 will result in a given torque being required to rotate the member 17 against this specific axial force. This value of torque in inch pounds can be set into the tool 18.

The lock nut 19 is tightly secured against the cup 15 after the initial factory adjustment has been made to hold the first arbor in its set axial position.

After the cutter has been used for prolonged periods, wear on the blades, general breaking in of the bearings and supports and the like can result in a lessening of the force exerted by the male blades against the female blades in an axial direction. As a consequence, proper cutting cannot always be assured. Accordingly, an operator or supervisor can periodically apply the shaft tool 18 to the movable member 17 after loosening the nut 19 and rotating the movable member until such time that the torque on the member again equals that originally determined at the factory. There is no possibility of error since the tool 18 cannot provide a torque exceeding the predetermined set torque therein.

After the foregoing adjustment is made, the lock nut 19 is simply tightened and the cutter can then continue to be used with proper quality of cuts being assured.

A very advantageous feature of this invention is the fact that the adjustment or axial movement of the arbor is made simultaneously with an automatic setting of the desired force to be applied by the blades. In other words, it is not necessary to provide an auxiliary sensing instrument which must be read and then adjustments made and then another reading taken and so forth. Rather, with the torque applying means in combination with the threaded structure described, only a single simple operation is required once the desired torque has been set into the tool.

It will be understood, of course, that where required different desired torques can readily be set into the tool 18 as by the adjustable means **18*b*** on the rear of the tool.

The torque applying means is useful not only for compensating for wear but for assuring proper readjustment of the biasing force of the male blades against the female blades after disassembly and sharpening of the blades.

From all of the foregoing, it will therefore be evident that the present invention has provided a greatly improved axial loading system for tape slitters.

I claim:

1. In a tape slitter including a frame supporting first and second arbors in spaced parallel relationship, said arbors carrying male and female blades respectively, and wherein the second arbor is held in said frame against axial movement while free to rotate, an axial loading system for said first arbor to enable adjustment of the axial force exerted by the male blades against the female blades, said loading system including, in combination:

(a) axially movable bearing means supporting said first arbor at each end for rotation in said frame;

(b) threaded means mounted on said frame and movable upon rotation to exert an axial force against said first arbor in a direction to increase the force of the male blades against the female blades; and (c) a manual adjustable torque applying means to rotate said threaded means until a given counter torque is exerted on said torque applying means corresponding to a given axial force, after which said threaded means can no longer be rotated by said torque applying means whereby a desired given force of said male blades against said female blades can be automatically set by said torque applying means without the need of special force indicating gauges.

2. The subject matter of claim 1, in which said threaded means includes a lock nut for securing the same in a given threaded position relative to said frame, after said desired given force has been set.

3. The subject matter of claim 1, including a resilient spring means between said first arbor and said threaded means to provide a given degree of resiliency between the male and female blades in an axial direction.

4. A tape slitter including, in combination:

(a) a frame;

(b) a first arbor;

(c) bearing means supporting said first arbor at each end in said frame for rotational movement relative to sad frame, said bearing means and first arbor being axially movable in said frame;

(d) a plurality of male blades in the form of discs carried on said first arbor in axially spaced positions;

(e) a second arbor;

(f) bearing means holding said second arbor at each end in said frame against axial movement while providing proper bearing for rotation;

(g) a plurality of female blades carried by said second arbor and having portions facing in a first axial direction towards one end of said first arbor for engaging said male blades respectively, so that movement of said first arbor in a second axial direction opposite to said first axial direction increases the engagement force between the male and female blades;

(h) a stationary, cup-shaped member secured to said frame adjacent to said one end of said first arbor, the floor of said cup-shaped member having a threaded opening coaxial with said first arbor;

(i) a movable member threadedly received in said opening;

(j) resilient means received in said cup-shaped member positioned between said movable member and said bearing means supporting said first arbor at said one end; and (k) a manually adjustable torque applying means to rotate said movable member until a given torque is exerted on said torque applying means corresponding to a given axial force, after which said movable member can no longer be rotated by said torque applying means whereby a desired given force of said male blades against said female blades can be automatically set by said torque applying means without the need of special force indicating gauges.

5. A tape slitter according to claim 4, in which said bearing means supporting said first arbor at each end includes an inner race, secured to the arbor and an outer race, said frame having a bore coaxial with the axis of said first arbor receiving said outer race in a telescoping manner, said movable member applying a force against said outer race.

* * * * *